Aug. 11, 1942.  G. H. BENNETT  2,292,504
COFFEE BREWER
Filed Sept. 1, 1939   2 Sheets-Sheet 1

INVENTOR
G. H. Bennett
BY John A. Seifert
ATTORNEY

Aug. 11, 1942.          G. H. BENNETT          2,292,504
                         COFFEE BREWER
              Filed Sept. 1, 1939         2 Sheets-Sheet 2
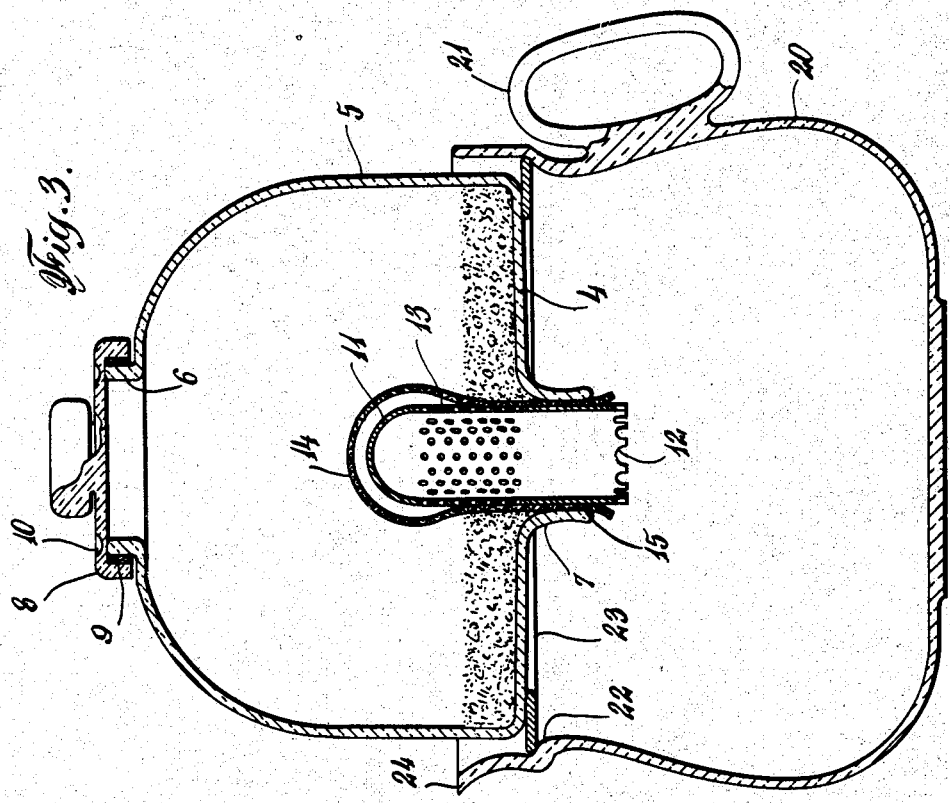
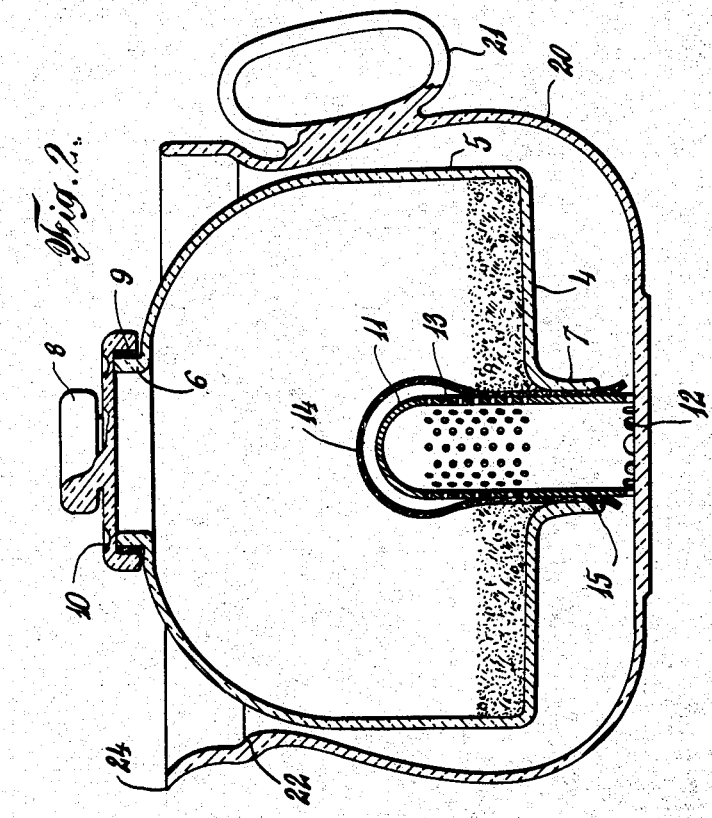
INVENTOR
G. H. Bennett
BY John A. Seifert
ATTORNEY Patented Aug. 11, 1942

2,292,504

UNITED STATES PATENT OFFICE 2,292,504

COFFEE BREWER

George H. Bennett, Astoria, N. Y.

Application September 1, 1939, Serial No. 293,078

9 Claims. (Cl. 53—3)

This invention relates to devices for making or brewing coffee, tea and other beverages, and it is an object of the invention to provide a container arranged to brew a beverage in a vacuum and discharge the brewed beverage into a suitable dispensing container by destroying the vacuum.

It is another object of the invention to provide a filtering element in a discharge outlet of the brewing container whereby the grounds will settle to the bottom of said container and the brewed liquid will flow from the container in a horizontal direction without removing the grounds therewith from the container.

It is another object of the invention to provide a dispensing container arranged to support the brewing container in elevated position relative thereto whereby the brewed liquid flows by gravity from the brewing container to the dispensing container when the vacuum is destroyed in the brewing container.

It is a further object of the invention to create a vacuum in the brewing container by filling said container with water through the discharge outlet thereof and sealing an air opening or vent of said container while the outlet is sealed by the water.

The embodiment of the invention comprises a container for ground coffee or tea leaves having openings in the opposite ends, the opening in the upper end being arranged to be hermetically sealed by a closure and the opposite opening in the lower end being partially closed by a filtering element comprising a tubular member closed at one end and with rows of horizontally disposed series of perforations adjacent said end and a filtering cloth of bag shape in cross section engaged over the closed end of the tubular member with the open ends of the filtering cloth and tubular member engaged in the opening in the lower end of the container to position the closed ends of the filtering cloth and tubular member and the perforated portion of the tubular member within the container. Ground coffee or tea leaves are placed in the container through the upper opening to cover the lower portion of the container, then hot or boiling water is placed in the container with the closure removed from the upper opening of the container, then after a sufficient quantity of water is in the container, the closure is positioned on the container to hermetically seal the upper opening and retain the water in the container to brew the ground coffee or tea leaves in a vacuum, and after the coffee grounds or tea leaves are brewed, then the brewed liquid is discharged from the container through the filtering element by removing the closure from the container. The lower opening of the container may be arranged with a depending flange to be engaged in a corresponding flanged opening in the upper end of a dispensing container with a gasket interposed between said flanges to hermetically seal the connection between said containers, whereby upon the removal of the closure from the first or brewing container, the brewed liquid will flow by gravity through the filtering element into the dispensing container. When the brewing container is hermetically connected to the dispensing container, the water is poured into the brewing container through the upper opening of said container. To assure the creation of a vacuum in the brewing container, the water may be entered into said container through the filtering element by positioning the brewing container into a dispensing container containing hot or boiling water and arranged to receive said brewing container whereby the water will enter the brewing container through the filtering element when the closure is removed from the upper opening of the brewing container. The closure is engaged on the brewing container to hermetically seal the upper opening after a sufficient quantity of water is in the brewing container and the brewing container may remain in the dispensing container or be removed from said container during the brewing of the coffee or tea, but the brewing container is removed from the dispensing container and supported in elevated position by and relative to the dispensing container to discharge the brewed liquid from the brewing container into the dispensing container. The brewed liquid is discharged by removing the closure from the upper opening of the brewing container.

In the drawings accompanying and forming a part of this application,

Figure 2 is an elevational view in section showing the brewing container in a dispensing container to fill the brewing container with water through the filtering element.

Figure 3 is an elevational view in section of the containers shown in Figure 2 and showing the brewing container in elevated position to discharge the brewed liquid from the brewing container into the dispensing container.

Figure 1:
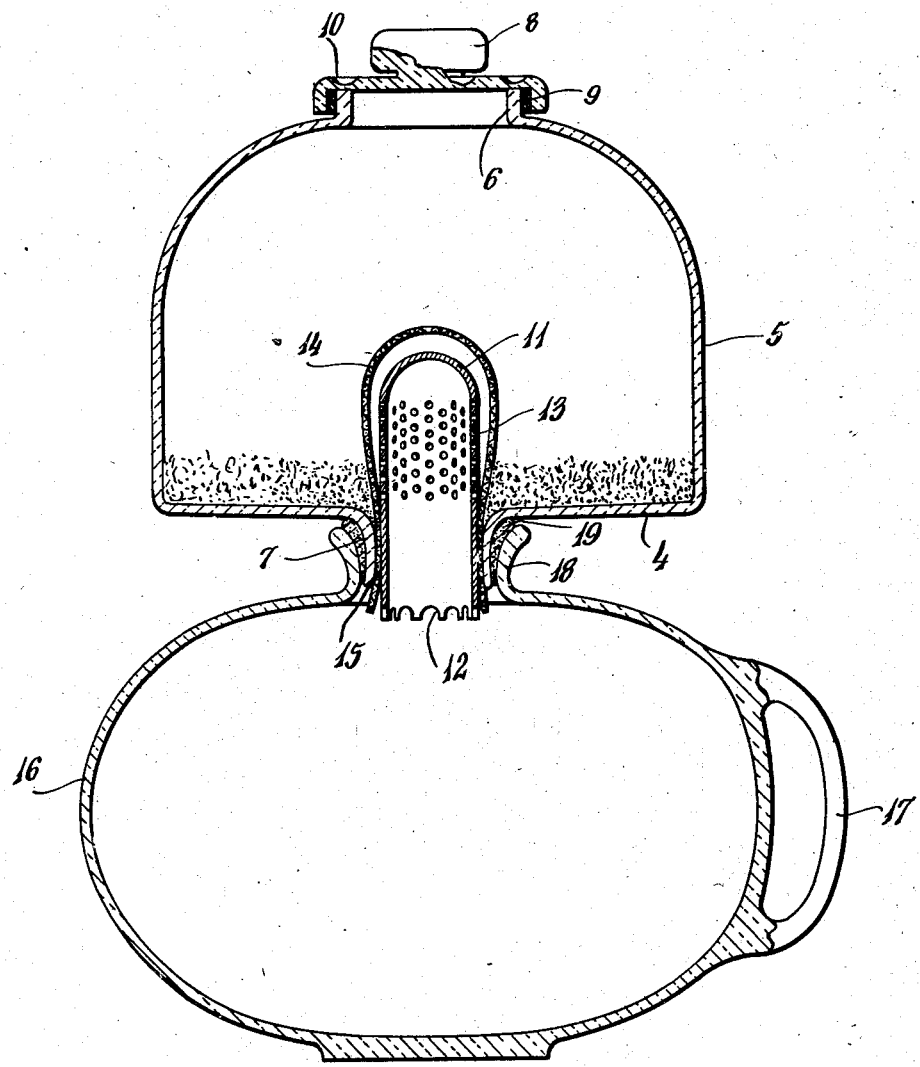
Figure 1 is an elevational view in cross section showing the embodiment of the invention wherein the water is poured into the brewing container through the upper opening therein.

In carrying out the embodiment of the invention illustrated in the accompanying drawings, the container for the ground coffee or the tea leaves and in which the brewing occurs, comprises a body of glass or other suitable material having a flat lower or bottom wall 4 merging at the periphery thereof with a side wall 5 extending perpendicularly therefrom with the upper portion of said side wall curving inwardly and terminating in an annular flange or collar 6 extending outwardly of the container and parallelly and concentrically of the vertical axis of the container. The bottom wall 4 of the brewing container is arranged with a center opening having an outwardly extending annular flange 7 concentrically of and of less diameter than the flange 6. The opening formed by the flange 6 constitutes the filler inlet and air vent, and the opening formed by the flange 7 forms the discharge outlet of the container.

The filler inlet and vent is hermetically sealed by a flanged closure 8 having the inner diameter of the flange slightly greater than the outer diameter of the flange 6 for the engagement of a sealing gasket 9 of yielding material, such as rubber. The outer flat face of the closure 8 is arranged with one or more recesses in alinement with and of greater cross area than the flange 6, as shown at 10, for a purpose to be hereinafter described.

The discharge outlet is partially closed by a filtering element comprising a tubular member of metal or glass having one end closed, as at 11, and the opposite end open and arranged with serrations 12 in the edge of said open end for a purpose to be hereinafter described. The straight side wall of the tubular member is arranged with a series of rows of perforations horizontally disposed between, the opposite ends with one end row of perforations spaced nearer the closed end 11 than the opposite end row of perforations is spaced from the serrated open end 12, as shown at 13, so that the entire perforated wall portion 13 will be positioned in the container and the serrated open end portion 12 will extend a substantial distance from the outer end of the flange 7 when the tubular member is mounted in the discharge outlet formed by said flange. The tubular member is mounted in the discharge outlet in liquid tight connection with the flange 7 by an annular piece of cloth interposed between said flange and tubular member which cloth may be in the form of a filtering cloth 14 of bag shape engaged over the closed end 11 of the tubular member with the open end portion of the bag extending between the tubular member and the flange 7, as shown at 15.

The ground coffee or tea leaves are placed in the brewing container through the filler inlet formed by the flange 6 and the hot or boiling water is placed in said container through either the filler inlet or discharge outlet of the container, but in either method, the closure 8 is removed from the flange 6 to permit the escape of air from the container during the entrance of the water therein.

In Figure 1, there is shown the manner of arranging the brewing container 4, 5 to permit the placing of the water in said container through the filler inlet. The container is mounted on and supported by a dispensing container 16 of glass or other suitable material having a handle or hand grip 17 and only one opening formed by an annular flange or neck of arcuate shape in cross section, as shown at 18. The flange 7 of the brewing container is engaged in said neck 18 with an annular gasket 19 of yielding material, such as rubber, interposed between the flanges to form a hermetic seal between the connection of said containers. In the operation of the brewing device shown in Figure 1, the ground coffee or tea leaves and the water are placed in the brewing container through the filler inlet thereof, and immediately after the water is placed in the container, the closure 8 is positioned on the flange 6 and sealed in said position by the gasket 9 to create a vacuum in the brewing container whereby the water is retained in said container and the brewed liquid will acquire the full aroma of the coffee or tea. The filtering element and the ground coffee or tea leaves will prevent the water passing into the dispensing container 16 during the pouring of the water into the brewing container until the closure is engaged on the filler inlet. After the water has brewed the ground coffee or tea leaves and acquired the full aroma of the ground coffee or tea leaves, the brewed liquid is permitted to flow through the filtering element into the dispensing container by destroying the vacuum in the brewing container upon the removal of the closure 8 from the flange 6. When the brewed liquid has been discharged from the brewing container to the dispensing container, the brewing container and the filtering element are removed from the neck 18 of the dispensing container to permit the brewed liquid to be served from the dispensing container through the opening in the annular flange 18.

In Figures 2 and 3, there is illustrated a method of delivering the water into the brewing container through the filtering element. In carrying out this method, there is provided a dispensing container 20 of glass or other suitable material having an integral handle 21 and an internal diameter greater than the outer diameter of the brewing container 4, 5 with an opening at the upper portion of said container 20 arranged with an inwardly extending portion to form an annular shoulder 22 having a diameter greater than the outer diameter of the brewing container. In the brewing of the coffee or tea by the containers shown in Figures 2 and 3, the ground coffee or tea leaves are deposited in the brewing container 4, 5 through the filler opening thereof and the hot or boiling water is placed in the dispensing container 20, or cold water may be heated in said dispensing container by suitable heating means, such as an electric hot plate. The brewing container having the ground coffee or tea leaves therein and the closure 8 removed from the flange 6, is slowly placed in the heated water in the dispensing container 20 to prevent spilling of the water from the dispensing container and the serrated end 12 of the filtering element is engaged with the bottom of the dispensing container to support the brewing container in the dispensing container, as shown in Figure 2. The serrations 12 will permit the heated water to flow from the dispensing container through the filtering element and into the brewing container by the force of the water in the dispensing container and the air in the brewing container escaping through the filler inlet of the brewing container. When the level of the liquid in the brewing container is even with the level of the liquid in the dispensing container, the closure 8 is engaged on the flange 6 and sealed to said flange by the gasket 9 which will result in the brewing of the ground coffee or tea leaves by the water in the container 4, 5 in a vacuum. The coffee or tea may be brewed in the container 4, 5 while said container remains in the dispensing container 20, or the container 4, 5 may be removed from said dispensing container with the water retained therein by the vacuum and the filtering element. When the brewing is completed, the brewed liquid is discharged from the brewing container 4, 5 to the dispensing container 20 by positioning the brewing container in elevated position relative to the dispensing container and removing the closure 8 from the filler inlet flange 6. The brewing container is supported in elevated position relative to the dispensing container by an annular member 23 having an outer diameter slightly larger than the annular shoulder 22 and less than the immediate portion of the open end of the dispensing container above said shoulder, whereby the annular member is removably supported by the shoulder, and an inner diameter less than the diameter of the bottom wall 4 of the brewing container, whereby the annular member engages and supports the brewing container, as shown in Figure 3. After the brewed liquid has been discharged from the brewing container into the dispensing container by the pressure of the air entering the open filler inlet of the brewing container, the brewing container and annular member 23 are removed from the dispensing container to permit the serving of the brewed liquid from the dispensing container by means of a pouring spout arranged in the edge portion of the open end of said container opposite the handle 21, as shown at 24.

The filtering element of the brewing container will prevent the coffee grounds or tea leaves from being discharged with the brewed liquid as the coffee grounds or tea leaves will settle to the bottom 4 of said container in a downward direction and the brewed liquid will flow from said container in a horizontal direction due to the horizontal arrangement of the perforations 13. This removal or separation of the coffee or tea from the brewed liquid will produce a more mellow and delicious brewed liquid by removing the bitter taste of said liquid which is caused by the coffee grounds or tea leaves remaining in the brewed liquid. The tubular member of the filtering element may be of greater length than shown in the drawings to have the end portion 11 extend into the container 4, 5 a greater distance and increase the perforated area of said member whereby the rate of flow of the brewed liquid from the brewing container will be increased.

To prevent dirt or foreign matter falling into the brewing container while the closure 8 is removed during the discharge of the brewed liquid from said container, the filler inlet may be covered by engaging the closure 8 on the edge of the flange 6 in inverted position with the recesses 10 in line with the flange to permit air to enter the brewing container and force the brewed liquid from said container.

The tubular member of the filtering element when used in the arrangement shown in Figure 1, may have the serrated open end 12 extended to adjacent the bottom of the dispensing container 16, so that said arrangement may be operated in the manner of the Silex type of coffee maker, wherein water is heated in the dispensing container by a source of heat, such as an electric hot plate, and forced up the tubular member into the brewing container with the closure 8 removed from the flange 6, and when there is sufficient water in said brewing container to properly brew the coffee or tea, said closure is engaged and sealed to said flange to create a vacuum and hold the water in the brewing container. At the completion of the brewing operation, the closure is removed from the flange and the brewed liquid is discharged into the dispensing container, which has not been removed from the source of heat, as in the Silex type of coffee maker, so that said dispensing container remains heated and will keep the brewed liquid hot for a longer period of time than the Silex coffee maker.

Having thus described my invention, I claim:

1. In a coffee brewer, a container for ground coffee to be brewed having openings in the opposite ends in axial alinement with each other and of different diameters and an annular flange depending exteriorly from the opening of smaller diameter, a closure arranged to hermetically seal the opening of larger diameter, a filtering element mounted in the flanged opening with the filtering portion extending into the container and above the ground coffee, and a second container having a single opening in the upper end thereof having a flange of substantially the same length as the flange of the smaller opening of the first container and extending exteriorly of the second container and adapted to be hermetically engaged by the flange of the first container to support the first container in superposed relation to the second container with the flange of the first container terminating within the flange of the second container.

2. A coffee brewer as claimed in claim 1, wherein the filtering element comprises a tubular member closed at one end and having a series of rows of perforations horizontally disposed in a group adjacent to the closed end thereof with the open end engaged in and extended from the depending flange of the first container into the second container, and the closed end and series of perforations positioned in said first container, whereby brewed liquid will flow in a horizontal direction from the first container into the tubular member without carrying coffee therewith.

3. In a coffee brewer, a container for coffee to be brewed having openings in the opposite ends, a filtering element mounted in the opening at the lower end of the container with the filtering portion in the container and a portion projecting from the lower end of the container, a closure to hermetically seal the opening in the upper end of the container, a second container for water having an interior dimension greater than the exterior dimension of the first container and the upper end open to permit engagement of the first container in the second container with the projecting portion of the filtering element supporting the first container upon the bottom of the second container and in communication with the water therein, and means removably mounted at the open end of the second container and arranged to engage the lower end of and support the first container in elevated position relative to the second container to permit the discharge of brewed liquid from the first container to the second container through the filtering element when the closure is removed from the upper opening of the first container.

4. A coffee brewer as claimed in claim 3, wherein the second container is arranged with a shoulder at the opening thereof, and the means to support the first container in elevated position comprises an annular member having an outer diameter to engage the shoulder of the second container and an inner diameter to engage the peripheral portion of the lower end of the first container.

5. A coffee brewer as claimed in claim 3, wherein the filtering element comprises a tubular member having one end closed and the opposite end open and arranged with a serrated edge, and an intermediate portion of the tubular member adjacent the closed end being arranged with a series of rows of horizontally disposed perforations, the tubular member being mounted in the lower opening of the first container in liquid sealed condition and with the closed end and perforated portion within the first container and the serrated open end projecting exteriorly of said container.

6. A coffee brewer as claimed in claim 3, wherein the filtering element comprises a tubular member having one end closed and the opposite end open and arranged with a serrated edge and an intermediate portion adjacent the closed end arranged with a series of rows of horizontally disposed perforations, and a filtering cloth of bag shape in cross section engaged on the tubular member with the closed ends of said member and filtering cloth juxtaposed to each other and the edge of the cloth at the open end thereof terminating within the serrated edge of the tubular member, said filtering element being engaged in the lower opening of the first container with the closed ends of the tubular member and filtering cloth and the perforated portion of the tubular member positioned in said container and the serrated edge of the tubular member positioned exteriorly of the container, and the filtering cloth binding the tubular member in the container opening.

7. In a coffee brewer, a container for coffee to be brewed having openings in the opposite ends, a filtering element mounted in the opening at the lower end of the container with the filtering portion in the container and a portion projecting from the lower end of the container, a closure to hermetically seal the opening in the upper end of the container, a second container for water having an interior dimension greater than the exterior dimension of the first container and the upper end open to permit engagement of the first container in the second container with the projecting portion of the filtering element supporting the first container upon the bottom of the second container and in communication with the water therein, and the first and second containers being arranged to support the first container in elevated position relative to the second container to permit discharge of brewed liquid from the first container to the second container through the filtering element when the closure is removed from the upper opening of the first container.

8. A coffee brewer comprising a container for ground coffee having openings in the opposite ends in axial alinement with each other and one opening being of greater diameter than the other opening, the opening of smaller diameter having a flange extending from the exterior of the container, and a straight wall tubular member closed at one end and open at the opposite end and having a series of perforations disposed in the wall thereof adjacent to the closed end and in spaced relation to the open end and the edge of said open end being serrated, and said tubular member mounted in the flange of the opening of smaller diameter of the container with the closed end and all of the perforations thereof positioned in the container and the serrated open end projecting exteriorly from the flange.

9. A coffee brewer as claimed in claim 8, a filtering cloth of bag shape engaged on the tubular member with the closed end portion loosely enveloping the closed end and perforations of the tubular member and the open end portion of the cloth interposed between the open end portion of the tubular member and the flange of the opening of smaller diameter of the container.

GEORGE H. BENNETT.